(12) United States Patent
Huang

(10) Patent No.: US 9,880,453 B2
(45) Date of Patent: Jan. 30, 2018

(54) PROJECTOR LASER LIGHT SOURCE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 294 days.

(21) Appl. No.: 14/958,947

(22) Filed: Dec. 4, 2015

(65) Prior Publication Data

US 2017/0045810 A1 Feb. 16, 2017

(30) Foreign Application Priority Data

Aug. 14, 2015 (TW) .............................. 104126464 A

(51) Int. Cl.
*G03B 21/20* (2006.01)
*G02B 19/00* (2006.01)
*G02B 26/00* (2006.01)
*G02B 27/14* (2006.01)
*G03B 33/08* (2006.01)

(52) U.S. Cl.
CPC ....... *G03B 21/204* (2013.01); *G02B 19/0014* (2013.01); *G02B 19/0047* (2013.01); *G02B 26/008* (2013.01); *G02B 27/141* (2013.01); *G03B 33/08* (2013.01)

(58) Field of Classification Search
CPC .................................................. G03B 21/204
See application file for complete search history.

(56) References Cited

U.S. PATENT DOCUMENTS

| | | | | |
|---|---|---|---|---|
| 8,469,520 B2* | 6/2013 | Maeda | ............... | G03B 21/2033 349/9 |
| 8,911,092 B2* | 12/2014 | Fujita | ................... | G03B 21/204 353/31 |
| 9,151,471 B2* | 10/2015 | Ogura | ..................... | F21V 13/08 |
| 9,229,301 B2* | 1/2016 | Huang | ................ | G03B 21/142 |
| 9,568,740 B2* | 2/2017 | Huang | ................... | G02B 27/26 |
| 9,645,480 B2* | 5/2017 | Liao | ..................... | G03B 21/204 |
| 2007/0127121 A1 | 6/2007 | Maximus et al. | | |
| 2010/0208342 A1 | 8/2010 | Olsen | | |

(Continued)

FOREIGN PATENT DOCUMENTS

TW 435044 B 5/2001

*Primary Examiner* — Bao-Luan Le
(74) *Attorney, Agent, or Firm* — CKC & Partners Co., Ltd.

(57) ABSTRACT

A projector laser light source includes two laser point sources, two lens groups, a color wheel, a reflector, a yellow reflector, a green reflector, and an integration rod. The color wheel includes a yellow phosphor layer, a reflective layer, and a green phosphor layer. The integration rod collects light focused on a third position. The positions of yellow phosphor layer and the reflective layer respectively correspond to a fourth position in a first timing and a second timing. Laser emitted by the laser point sources is focused on the third position and the fourth position by two optical Fourier transforms performed by the lens groups, and the laser point sources and the lens groups are combined with the specially designed optical configuration of the green phosphor layer, the reflector, the yellow reflector, and the green reflector. Therefore, two sets of three primary light sources are focused on the third position.

10 Claims, 11 Drawing Sheets

(56) References Cited

U.S. PATENT DOCUMENTS

| | | | |
|---|---|---|---|
| 2010/0328632 A1* | 12/2010 | Kurosaki | G03B 21/204 353/98 |
| 2011/0193893 A1 | 8/2011 | Miyazawa | |
| 2011/0310353 A1* | 12/2011 | Maeda | G03B 21/2033 353/31 |
| 2012/0201030 A1 | 8/2012 | Yuan et al. | |
| 2013/0021582 A1* | 1/2013 | Fujita | G03B 21/204 353/31 |
| 2013/0114049 A1 | 5/2013 | Li et al. | |
| 2013/0250253 A1* | 9/2013 | Ogura | F21V 13/08 353/85 |
| 2013/0322056 A1* | 12/2013 | Konuma | F21V 13/14 362/84 |
| 2014/0285774 A1* | 9/2014 | Tajiri | G03B 21/28 353/38 |
| 2015/0153636 A1* | 6/2015 | Hartwig | G03B 21/204 353/31 |
| 2015/0177599 A1* | 6/2015 | Huang | G03B 21/142 353/31 |
| 2015/0362830 A1* | 12/2015 | Liao | G03B 21/204 353/31 |
| 2016/0041399 A1* | 2/2016 | Huang | G02B 27/26 362/231 |

* cited by examiner

PROJECTOR LASER LIGHT SOURCE

RELATED APPLICATIONS

This application claims priority to Taiwan Application Serial Number 104126464, filed Aug. 14, 2015, which are herein incorporated by reference.

BACKGROUND

Technical Field

The present disclosure relates to a projector laser light source, and more particularly, to a projector laser light source with six primary light sources.

Description of Related Art

In order to meet the evolving requirements of screen imaging, technologies of the display apparatus continue to progress. The display apparatus with six primary light sources can provide images with a wider color gamut, such that the images become more real, more solid, and more layered. In addition, different images can be shown respectively for the left eye and the right eye by two sets of three primary light sources of the display apparatus. Then, after unwanted light is filtered respectively for the left eye and the right eye by the pair of the 3D glasses, the three-dimensional images are displayed.

Because the spectrum of the six primary light sources should not overlap each other, the display apparatus with six primary light sources usually uses a laser as its light source. However, there are few suitable light sources for the red laser light source and the green laser light source of the display apparatus of the six primary light sources, thus making the manufacturing of the display apparatus with the six primary light sources difficult.

SUMMARY

This disclosure provides a projector laser light source using a yellow phosphor layer and a green phosphor layer to replace the red laser light source and the green laser light source, such that the volume of the projector laser light source is reduced.

In one aspect of the disclosure, a projector laser light source is provided. The projector laser light source includes a first laser point source, a second laser point source, a first lens group, a second lens group, a color wheel, a reflector, a yellow reflector, a green reflector, and an integration rod. The first laser point source is disposed at a first position and configured to emit a first blue light. The second laser point source is disposed at a second position and configured to emit a second blue light in a first timing and emit a third blue light and a red light in a second timing. The first lens group has a front focal plane, in which the first position and the second position is located on the front focal plane, the first blue light becomes a parallel light directed toward a first direction after the first blue light passes the first lens group, the second blue light, the third blue light, and the red light become parallel light directed toward a second direction after the second blue light, the third blue light, and the red light pass the first lens group. The second lens group has a rear focal plane, in which the second blue light, the third blue light, and the red light passing the first lens group are focused on a third position on the rear focal plane after the second blue light, the third blue light, and the red light pass the second lens group, the first blue light passing the first lens group is focused on a fourth position on the rear focal plane after the first blue light passes the second lens group. The color wheel includes a yellow phosphor layer, a reflective layer, and a green phosphor layer. A position of the yellow phosphor corresponds to the fourth position in the first timing. The yellow phosphor layer is configured to reflect the incident first blue light and convert the first blue into a yellow light. The yellow light becomes a parallel light in reverse to the first direction after the yellow light passes the second lens group. A position of the reflective layer corresponds the fourth position in the second timing. The reflective layer is configured to reflect the incident first blue light. The reflected first blue light become a parallel light in reverse to the first direction after the first blue light passes the second lens group. A position of the green phosphor layer corresponds to a fifth position in the second timing. The green phosphor layer is configured to reflect the incident first blue light and convert the first blue light into a green light. The green light becomes a parallel light in reverse to a third direction after the green light passes the second lens group. The reflector is configured to reflect the first blue light in reverse to the first direction, such that the reflected first blue light is toward the third direction and focused on the fifth position on the rear focal plane after the first blue light passes the second lens group. The yellow reflector is configured to reflect the yellow blue light in reverse to the first direction, such that the reflected yellow light is toward the second direction and focused on the third position on the rear focal plane after the yellow light passes the second lens group. The green reflector is configured to reflect the green light in reverse to the third direction, such that the reflected green light is toward the second direction and focused on the third position on the rear focal plane after the green light passes the second lens group. The integration rod is configured to collect the light focused on the third position.

In one or more embodiments, a ratio of a distance between the first position and the second position and a distance between the third position and the fourth position is the same as a ratio of a focal length of the first lens group and a focal length of the second lens group.

In one or more embodiments, a distance between the third position and the fifth position is the same as a distance between the fourth position and the fifth position.

In one or more embodiments, an optical axis of the first lens group is parallel to an optical axis of the second lens group.

In one or more embodiments, the yellow reflector is perpendicular to an optical axis of the first lens group.

In one or more embodiments, the green reflector is transparent to the first blue light and the yellow light, and the yellow reflector is transparent to the first blue light.

In one or more embodiments, the first lens group comprises two converging lenses, and the second lens group comprises two converging lenses.

In one or more embodiments, the color wheel comprise an upper part and a lower part, the yellow phosphor is disposed on the upper part, the reflective layer and the green phosphor layer are disposed on the lower part, and the reflective layer is closer to a center of the color wheel than the green phosphor is.

In one or more embodiments, a wavelength of the first blue light and the second blue light is the same.

In one or more embodiments, after the integration rod collects the light focused on the third position, the integration rod splits the light to generate a first primary blue light, a second primary green light, and a first primary red light in the first timing and generate a second primary blue light, a first primary green light, and a second primary red light in the second timing.

In the optical path, the projector laser light source focuses laser light emitted by the first laser point source and the second laser point source on two points by two optical Fourier transforms performed by the first lens group and the second lens group. The aforementioned optical path is also combined with the specially designed optical path of the yellow phosphor layer, the reflective layer, and the green phosphor layer of the color wheel and the reflector, the yellow reflector, the green reflector, such that the two sets of three primary light sources are focused on the position of the integration rod. Therefore, only a bit of optical components and a simple structure design are needed to generate the two sets of three primary light sources, such that the volume of the projector laser light source is reduced and the projector laser light source can be accommodated into a conventional video screening device (i.e., a movie projector).

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
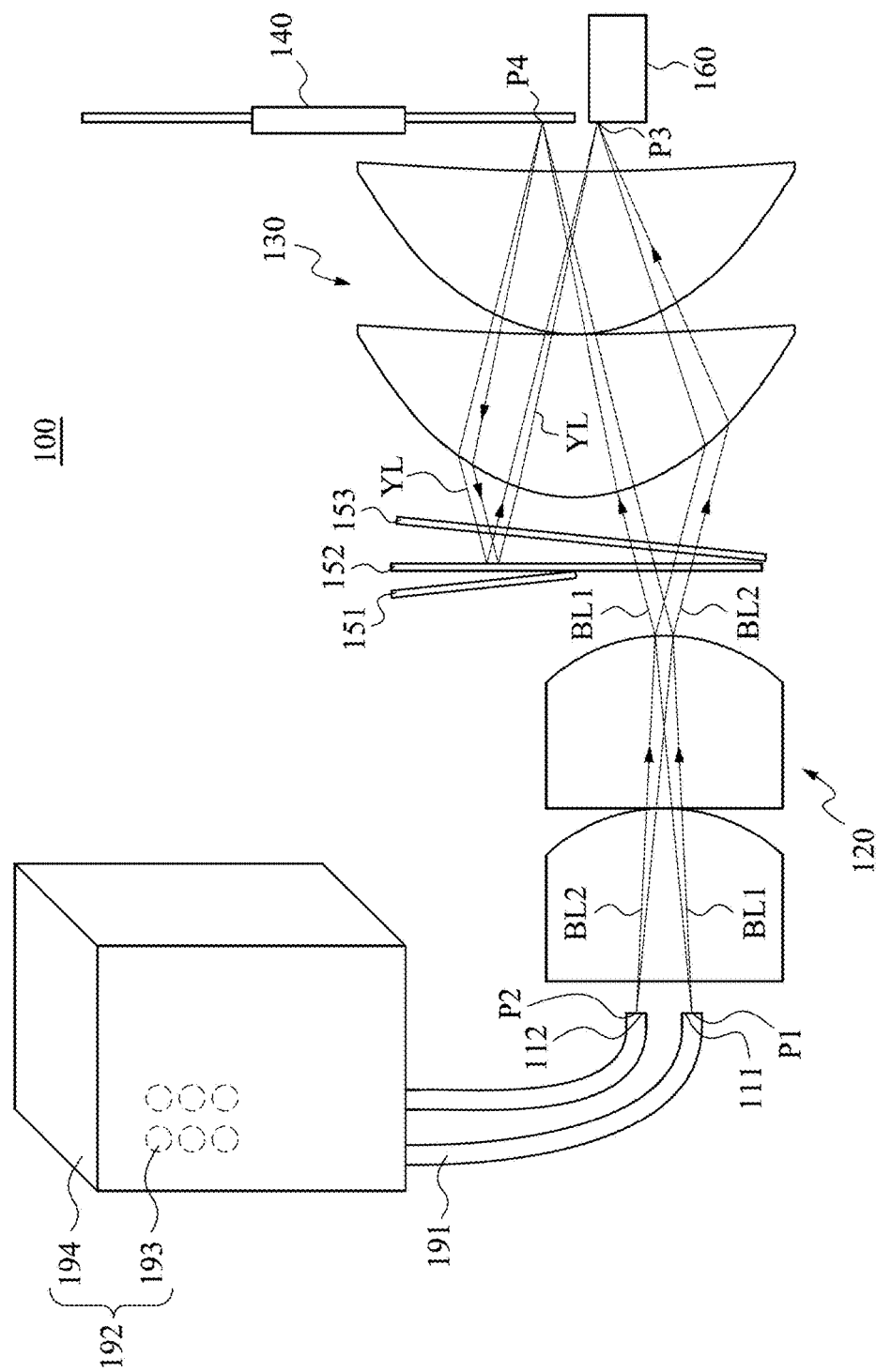
FIG. 1 is a schematic side view of a projector laser light source in a first timing according to one embodiment of this invention.

FIG. 1 is a schematic side view of a projector laser light source 100 in a first timing according to one embodiment of this invention. The projector laser light source 100 is provided. In the first timing, the projector laser light source 100 emits two blue lasers with the same wavelength and then converts a part of the blue laser into a yellow light by a yellow phosphor layer. Then, the yellow light is split into a primary green light and a primary red light, and the blue laser is as a primary blue light, such that a first set of three primary light is obtained. In a second timing, the projector laser light source 100 emits two blue lasers with different wavelengths and a red laser and converts one of the blue laser into a green light by a green phosphor later, such that a second set of three primary light is obtained by combining the blue laser, the red laser, and the green light. By using the yellow light emitted by the yellow phosphor layer and the green light emitted by the green phosphor layer as the primary light, only two blue laser light sources and one red laser light source is needed to obtain two sets of three primary light.

As shown in FIG. 1, the projector laser light source 100 includes a first laser point source 111, a second laser point source 112, a first lens group 120, a second lens group 130, a color wheel 140, a reflector 151, a yellow reflector 152, a green reflector 153, and an integration rod 160.

In the optical path, the projector laser light source 100 focuses laser light emitted by the first laser point source 111 and the second laser point source 112 on two points by two optical Fourier transforms performed by the first lens group 120 and the second lens group 130. The aforementioned optical path design is also combined with the color wheel 140 and the reflector 151, the yellow reflector 152, the green reflector 153, such that the two sets of three primary light is focused on the position of the integration rod 160. Therefore, only a bit of optical components and a simple structure design are needed to generate the two sets of three primary light sources, such that the volume of the projector laser light source 100 is reduced and the projector laser light source 100 can be accommodated into a conventional video screening device (i.e., a movie projector).

The first laser point source 111 is disposed at a first position P1 and configured to emit a first blue light BL1. The second laser point source 112 is disposed at a second position P2 and configured to emit a second blue light BL2 in the first timing. The first lens group 120 has a front focal plane, in which the first position P1 and the second position P2 is located on the front focal plane. The first blue light BL1 becomes a parallel light directed toward a first direction after the first blue light BL1 passes the first lens group 120, and the second blue light BL2 become a parallel light directed toward a second direction after the second blue light BL2 passes the first lens group 120.

The second lens group 130 has a rear focal plane. The second blue light BL2 passing the first lens group 120 are focused on a third position P3 on the rear focal plane after the second blue light BL2 passes the second lens group 130, and the first blue light BL1 passing the first lens group 120 is focused on a fourth position P4 on the rear focal plane after the first blue light BL1 passes the second lens group 130.

Figure 2:
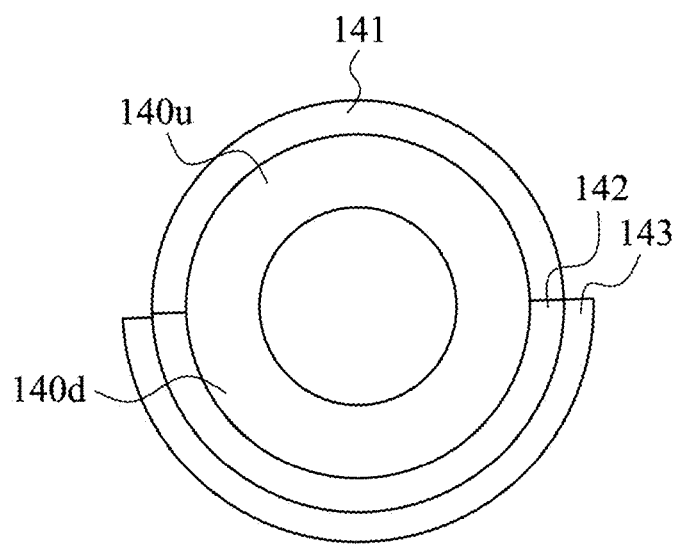
FIG. 2 is a schematic front view of a color wheel according to one embodiment of this invention.

FIG. 2 is a schematic front view of the color wheel 140 according to one embodiment of this invention. As shown in FIG. 2, the color wheel 140 includes a yellow phosphor layer 141, a reflective layer 142, and a green phosphor layer 143. Specifically, the color wheel 140 has an upper part 140u and a lower part 140d. The yellow phosphor 141 is disposed on the upper part 140u, the reflective layer 142 and the green phosphor layer 143 are disposed on the lower part 140d, and the reflective layer 142 is closer to the center of the color wheel 140 than the green phosphor 143 is.

As shown in FIG. 1 and FIG. 2, the position of the yellow phosphor layer 141 corresponds to the fourth position P4 in the first timing. The yellow phosphor layer 141 is configured to reflect the incident first blue light BL1 and convert the first blue BL1 into a yellow light YL. The yellow light YL becomes a parallel light in reverse to the first direction after the yellow light YL passes the second lens group 130.

The yellow reflector 152 is configured to reflect the yellow blue light YL in reverse to the first direction, such that the reflected yellow light YL is toward the second direction and focused on the third position P3 on the rear focal plane after the yellow light YL passes the second lens group 130.

The green reflector 153 is transparent to the yellow light YL. Therefore, the yellow light YL is reflected by the yellow reflector 152 after the yellow light YL passes the green reflector 153. In addition, because the spectrum of the yellow light YL includes the green component and the red component, the yellow light YL can be split into a green light and a red light.

The integration rod 160 is configured to collect the light focused on the third position P3. In the first timing, the integration rod 160 collects the light focused on the third position P3 and homogenizes the light, and the homogenous light is split to generate a first primary blue light, a second primary green light, and a first primary red light by a beam splitting device (not shown). Specifically, the second blue light BL2 focused on the third position P3 is the first primary blue light, the beam splitting device behind the integration rod 160 to generate the second primary green light and the first primary red light splits the yellow light YL focused on the third position P3.

As shown in FIG. 1, the optical paths of the first blue light BL1, the second blue light BL2, and the yellow light YL are schematic, not real optical paths.

Figure 3:
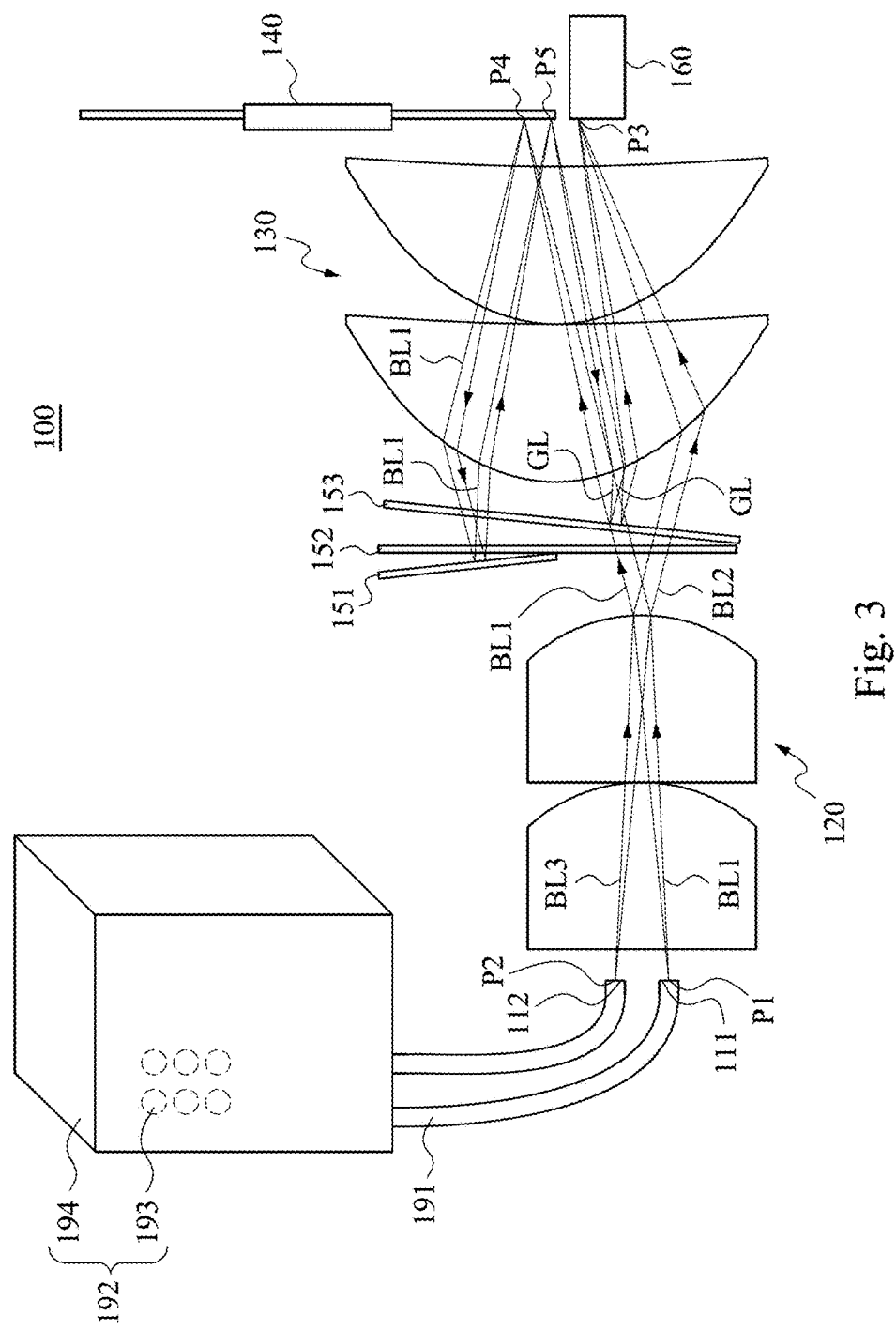
FIG. 3 is a schematic side view of the projector laser light source in a second timing according to one embodiment of this invention.

FIG. 3 is a schematic side view of the projector laser light source 100 in the second timing according to one embodiment of this invention. As shown in FIG. 3, the first laser point source 111 emits a first blue light BL1, and the second laser point source 112 emits a third blue light BL3 and a red light (because the optical path of the third blue light BL3 overlaps the red light, only the third blue light BL3 is depicted in FIG. 3) at the same time.

The first blue light BL1 becomes a parallel light toward the first direction after the first blue light BL1 passes the first lens group 120. The third blue light BL3 and the red light become parallel light directed toward the second direction after the third blue light BL3 and the red light pass the first lens group 120. The third blue light BL3 and the red light passing the first lens group 120 are focused on the third position P3 on the rear focal plane after the third blue light BL3 and the red light pass the second lens group 130. The first blue light BL1 passing the first lens group 120 is focused on the fourth position P4 on the rear focal plane after the first blue light BL1 passes the second lens group 130.

As shown in FIG. 2 and FIG. 3, the position of the reflective layer 142 corresponds the fourth position P4 in the second timing. The reflective layer 142 is configured to reflect the incident first blue light BL1. The reflected first blue light BL1 become a parallel light in reverse to the first direction after the first blue light BL1 passes the second lens group 130.

The reflector 151 is configured to reflect the first blue light BL1 reversed to the first direction, such that the reflected first blue light BL1 is directed toward the third direction and focused on a fifth position P5 on the rear focal plane after the first blue light BL1 passes the second lens group 130.

The green reflector 153 and the yellow reflector 152 are transparent to the first blue light BL1. Therefore, the first blue light BL1 is reflected by the reflector 151 after the first blue light BL1 passes the green reflector 153 and the yellow reflector 152.

The position of the green phosphor 143 corresponds to the fifth position P5 in the second timing. The green phosphor layer 143 is configured to reflect the incident first blue light BL1 and converts the first blue light BL1 into a green light GL. The green light GL becomes a parallel light reversed to a third direction after the green light GL passes the second lens group 130.

The green reflector 153 is configured to reflect the green light GL in reverse to the third direction, such that the reflected green light GL is toward the second direction and focused on the third position P3 on the rear focal plane after the green light GL passes the second lens group 130.

In the second timing, the integration rod 160 collects the light focused on the third position P3 and homogenizes the light, and the homogenous light is split to generate a second primary blue light, a first primary green light, and a second primary red light by the beam splitting device (not shown) behind the integration rod 160. Specifically, the third blue light BL3 focused on the third position P3 is the second primary blue light, the red light focused on the third position P3 is the second primary red light, and the green light GL focused on the third position P3 is the first primary green light.

As shown in FIG. 3, the first blue light BL1, the optical paths of the third blue light BL3, and the green light GL are schematic, not real optical paths.

Specifically, the first laser point source 111 and the second laser point source 112 may respectively be openings of optical fibers, and openings of the other ends of the optical fibers are connected to a laser light source module 192. The laser light source module 192 may include a plurality of laser sources 193 and a case 194. The laser light sources 193 may be disposed in an array in the case 194, and the laser emitted by the laser light source 193 are all collected in the optical fibers 191 due to the high etendue of the laser.

The first laser point source 111 emits the first blue light BL1 in the first timing and the second timing, so the first laser point source 111 is a CW laser. In the first timing, the second laser point source 112 emits the second blue light BL2, and in the second timing, the second laser point source 112 emits the third blue light BL3 and the red light. Therefore, the second laser point source 112 is a pulsed laser.

The spectrum of the first blue light BL1 and the second blue light BL2 is the same. Alternatively, the wavelength of the first blue light BL1 and the second blue light BL2 is the same. In addition, the spectrum of the first blue light BL1 is different from the spectrum of the third blue light BL3.

Specifically, the ratio of the distance between the first position P1 and the second position P2 and the distance between the third position P3 and the fourth position P4 is the same as the ratio of the focal length of the first lens group 120 and the focal length of the second lens group 130.

Specifically, the distance between the third position P3 and the fifth position P5 is the same as the distance between the fourth position P4 and the fifth position P5. Embodiments of this disclosure are not limited thereto. People having ordinary skill in the art can make proper modifications to the third position P3, the fourth position P4, and the fifth position P5 depending on the actual application.

Specifically, the optical axis of the first lens group 120 is parallel to the optical axis of the second lens group 130, and the yellow reflector 152 is perpendicular to the optical axis of the first lens group 120 (in other words, the yellow reflector 152 is perpendicular to the optical axis of the second lens group 130).

In this embodiment, the first lens group 120 includes two converging lenses, and the second lens group 130 includes two converging lenses. Embodiments of this disclosure are not limited thereto. In other embodiments, the first lens group 120 may include one converging lens or a plurality of (converging) lenses, and the second lens group 130 may include one converging lens or a plurality of (converging) lenses as long as the first lens group 120 and the second lens group 130 have a good imaging ability.

Specifically, the yellow phosphor layer 141 and the green phosphor layer 143 are made of YAG phosphor (YAG:Ce). Embodiments of this disclosure are not limited thereto. People having ordinary skill in the art can make proper modifications to the yellow phosphor layer 141 and the green phosphor layer 143 depending on the actual application.

Specifically, the directions of the reflector 151, the yellow reflector 152, and the green reflector 153 are different from each other.

Specifically, the beam splitting device may include a dichroic mirror to split light. Embodiments of this disclosure are not limited thereto. People having ordinary skill in the art can make proper modifications to the beam splitting device depending on the actual application.

Figure 4:
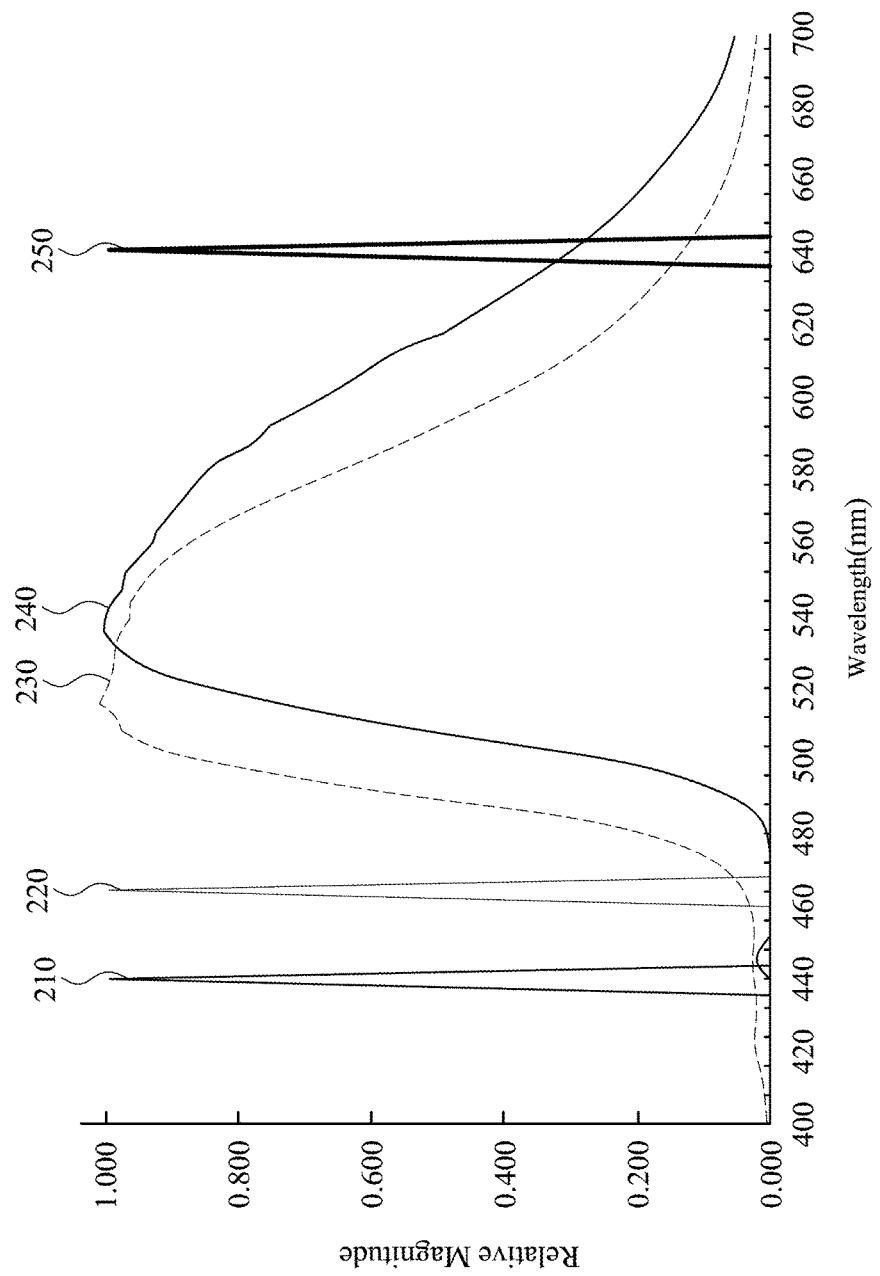
FIG. 4 is a diagram showing spectral distributions of light according to one embodiment of this invention.

FIG. 4 is a diagram showing spectral distributions of light according to one embodiment of this invention. As shown in FIG. 4, spectrum 210 represents the spectral distribution of the first blue light BL1, spectrum 220 represents the spectral distribution of the third blue light BL3, spectrum 230 represents the spectral distribution of the green light GL, spectrum 240 represents the spectral distribution of the yellow light YL, and spectrum 250 represents the spectral distribution of the red light (the red light is emitted by the second laser point source 112).

In order to make the projector laser light source 100 with the aforementioned two sets of three primary light provide images with a wider color gamut and make the projector laser light source 100 combined with 3D glasses provide three-dimensional images, the spectrums of the two sets of the three primary light of the projector laser light source 100 are designed not to overlap each other. Therefore, the beam splitting device, the yellow reflector 152, and the green reflector 153 are specially designed, such that the spectral distributions of light of FIG. 4 become spectrums of the two sets of three primary light which do not overlap each other. Detailed information of one embodiment is described below.

Figure 5:
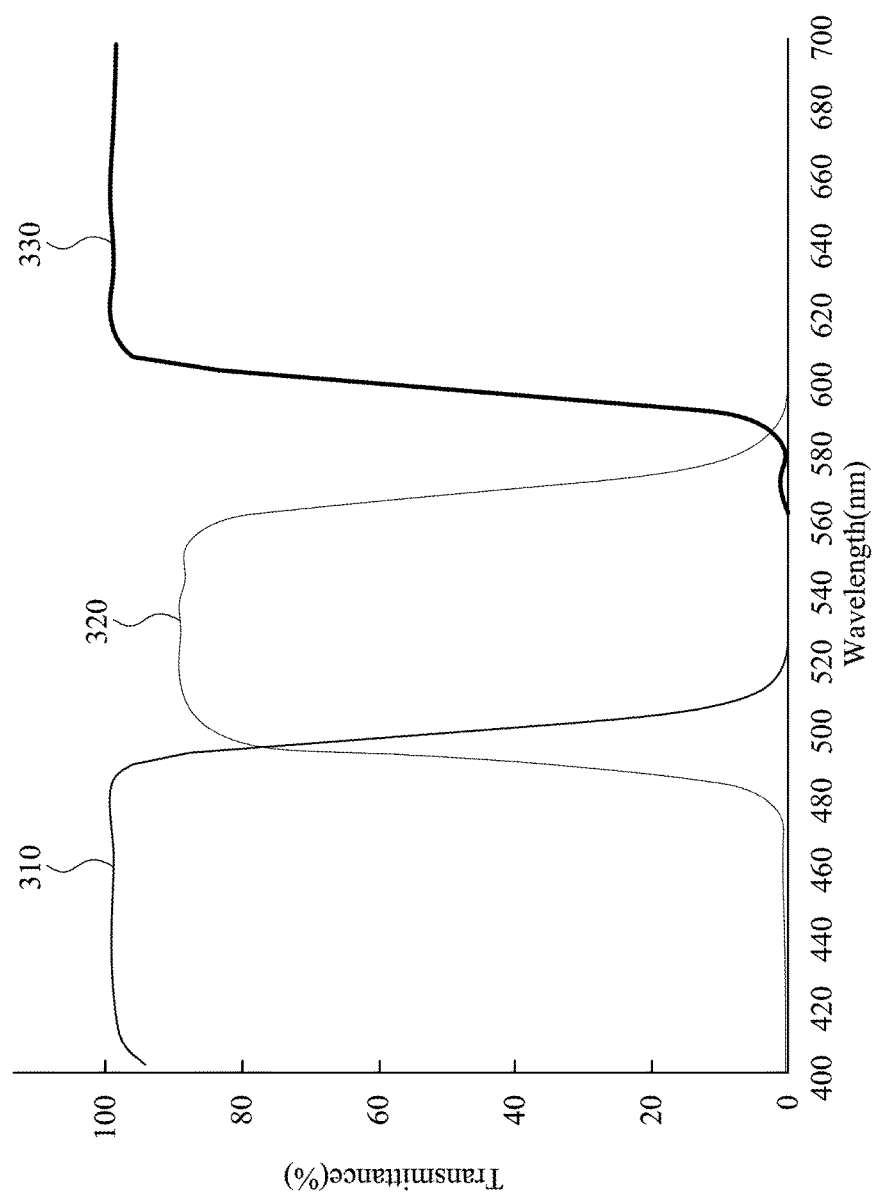
FIG. 5 is a transmittance to wavelength figure of a beam splitting device for light with different colors according to one embodiment of this invention.

FIG. 5 is a transmittance to wavelength figure of the beam splitting device for light with different colors according to one embodiment of this invention. As shown in FIG. 5, curve 310 represents transmittances of the beam splitting device for blue light with different wavelengths, curve 320 represents transmittances of the beam splitting device for green light with different wavelengths, and curve 330 represents transmittances of the beam splitting device for red light with different wavelengths.

Figure 6:
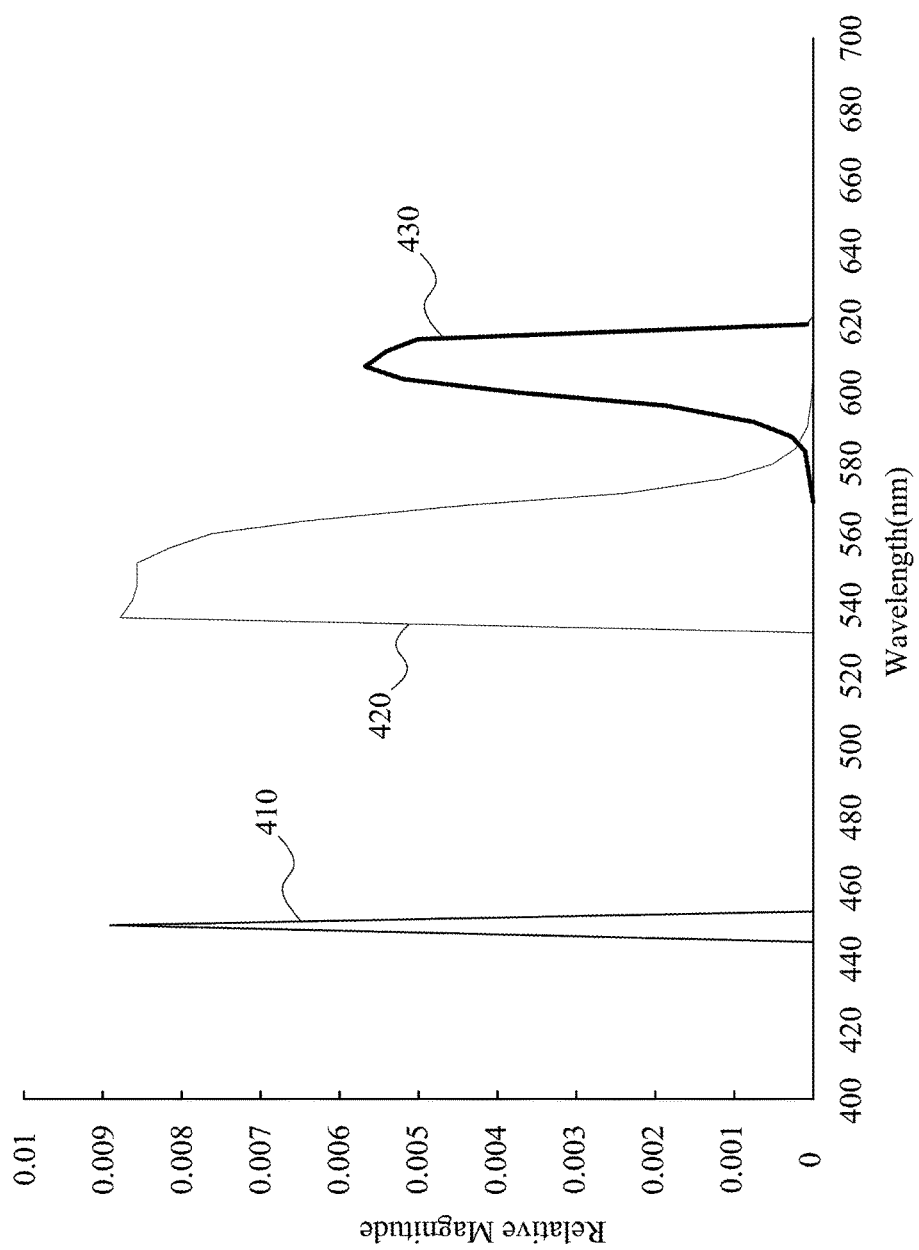
FIG. 6 is a relative magnitude to wavelength figure of a first primary blue light, a second primary green light, and a first primary red light split by the beam splitting device in the first timing according to one embodiment of this invention.

FIG. 6 is a relative magnitude to wavelength figure of the first primary blue light, the second primary green light, and the first primary red light split by the beam splitting device in the first timing according to one embodiment of this invention. As shown in FIG. 6, spectrum 410 represents the spectral distribution of the first primary blue light, spectrum 420 represents the spectral distribution of the second primary green light, and spectrum 430 represents the spectral distribution of the first primary red light.

Figure 7:
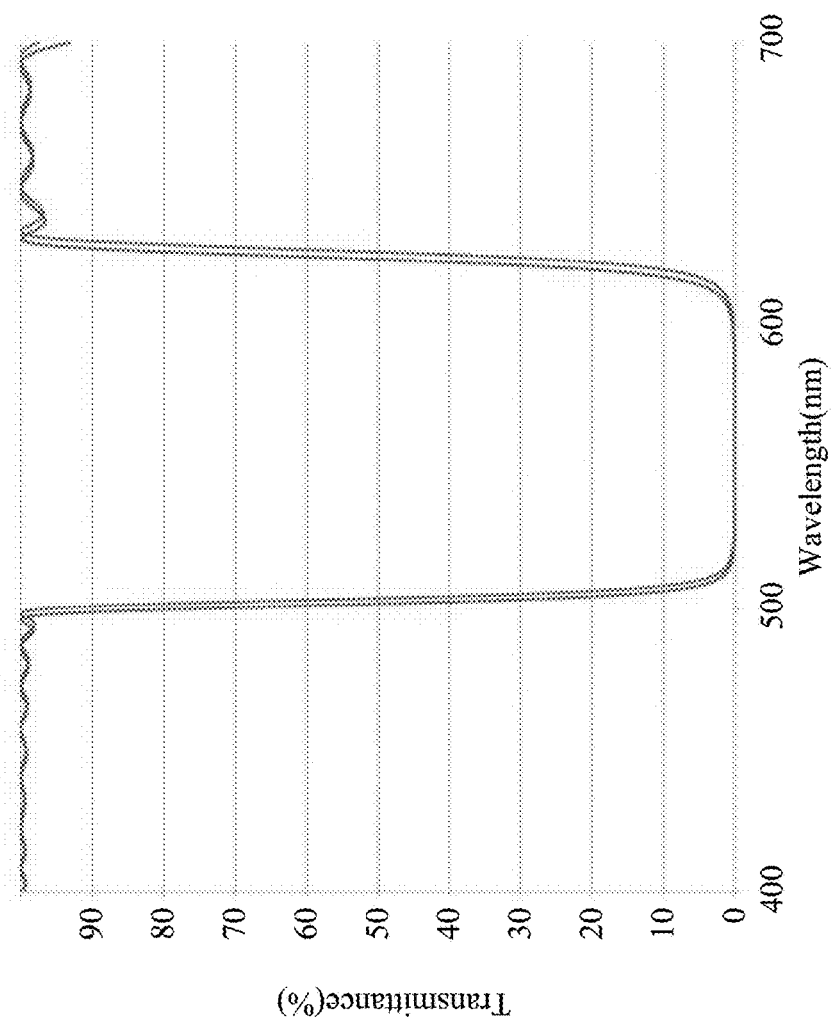
FIG. 7 is a transmittance to wavelength figure of a yellow reflector according to one embodiment of this invention.

FIG. 7 is a transmittance to wavelength figure of the yellow reflector 152 according to one embodiment of this invention. As shown in FIG. 4, FIG. 5, FIG. 6, and FIG. 7, spectrum 210 (the spectral distribution of the first blue light BL1) corresponds spectrum 410 (the spectral distribution of the first primary blue light). If spectrum 240 (the spectral distribution of the yellow light YL) is compared with curves 320 and 330, and FIG. 7, you can find that the light with the wavelength in a range between about 530 nm to about 620 nm of the yellow light YL is reflected by the yellow reflector 152. After the yellow reflector reflects the light, the beam splitting device splits the yellow light YL, so as to form the second primary green light with spectrum 420 and the first primary red light with spectrum 430.

Figure 8:
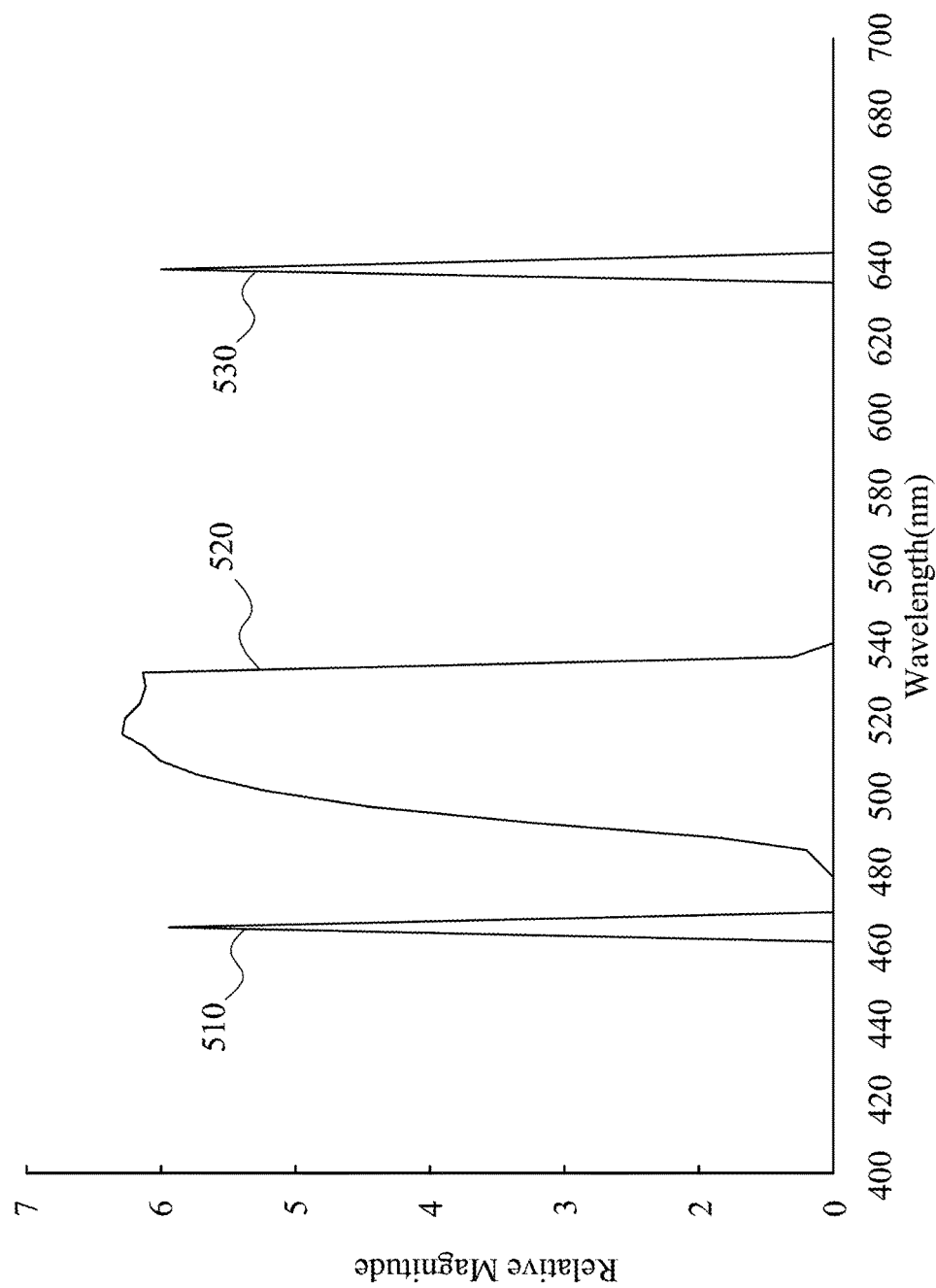
FIG. 8 is a relative magnitude to wavelength figure of a second primary blue light, a first primary green light, and a second primary red light split by the beam splitting device in the second timing according to one embodiment of this invention.

FIG. 8 is a relative magnitude to wavelength figure of the second primary blue light, the first primary green light, and the second primary red light split by the beam splitting device in the second timing according to one embodiment of this invention. As shown in FIG. 8, spectrum 510 represents the spectral distribution of the second primary blue light, spectrum 520 represents the spectral distribution of the first primary green light, and spectrum 530 represents the spectral distribution of the second primary red light.

Figure 9:
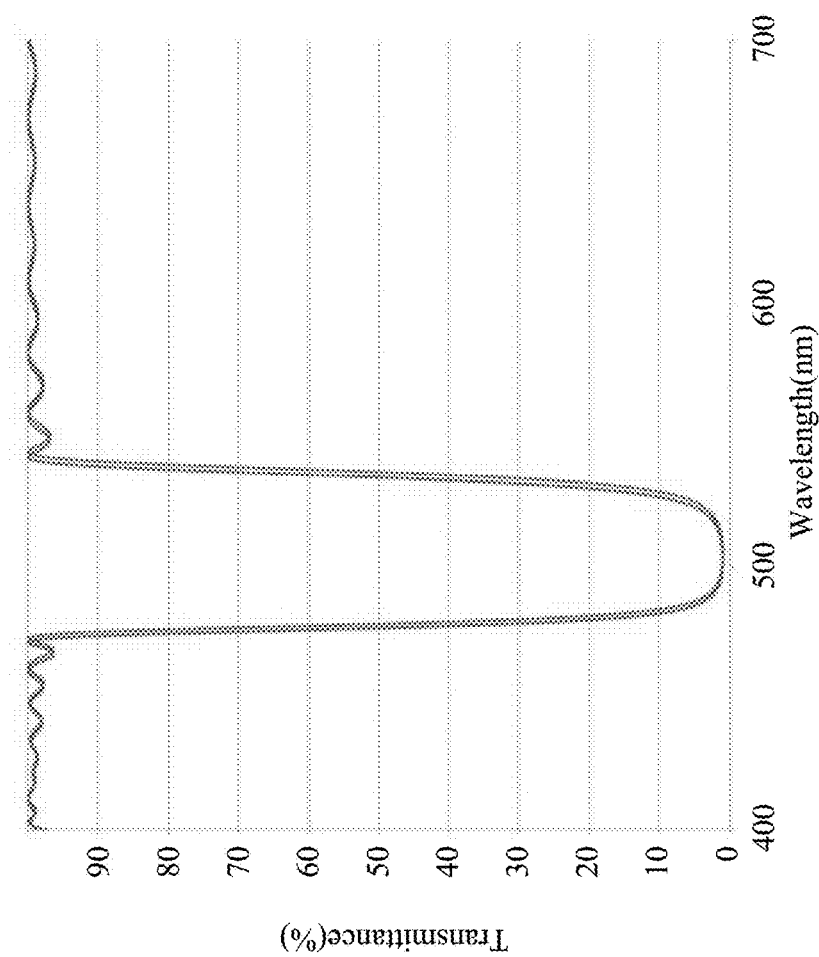
FIG. 9 is a transmittance to wavelength figure of a green reflector according to one embodiment of this invention.

FIG. 9 is a transmittance to wavelength figure of the green reflector 153 according to one embodiment of this invention. As shown in FIG. 4, FIG. 5, FIG. 8, and FIG. 9, spectrum 220 (the spectral distribution of the third blue light BL3) corresponds spectrum 510 (the spectral distribution of the second primary blue light), and spectrum 250 (the spectral distribution of the red light emitted by the second laser point source 112) corresponds spectrum 530 (the spectral distribution of the second primary red light). If spectrum 230 (the spectral distribution of the green light GL) is compared with curves 320 and FIG. 9, you can find that the green reflector 153 reflects the light with the wavelength in a range between about 480 nm to about 540 nm of the green light GL. After the green reflector reflects the light, the beam splitting device splits the green light GL, so as to form the first primary green light with spectrum 520.

Figure 10:
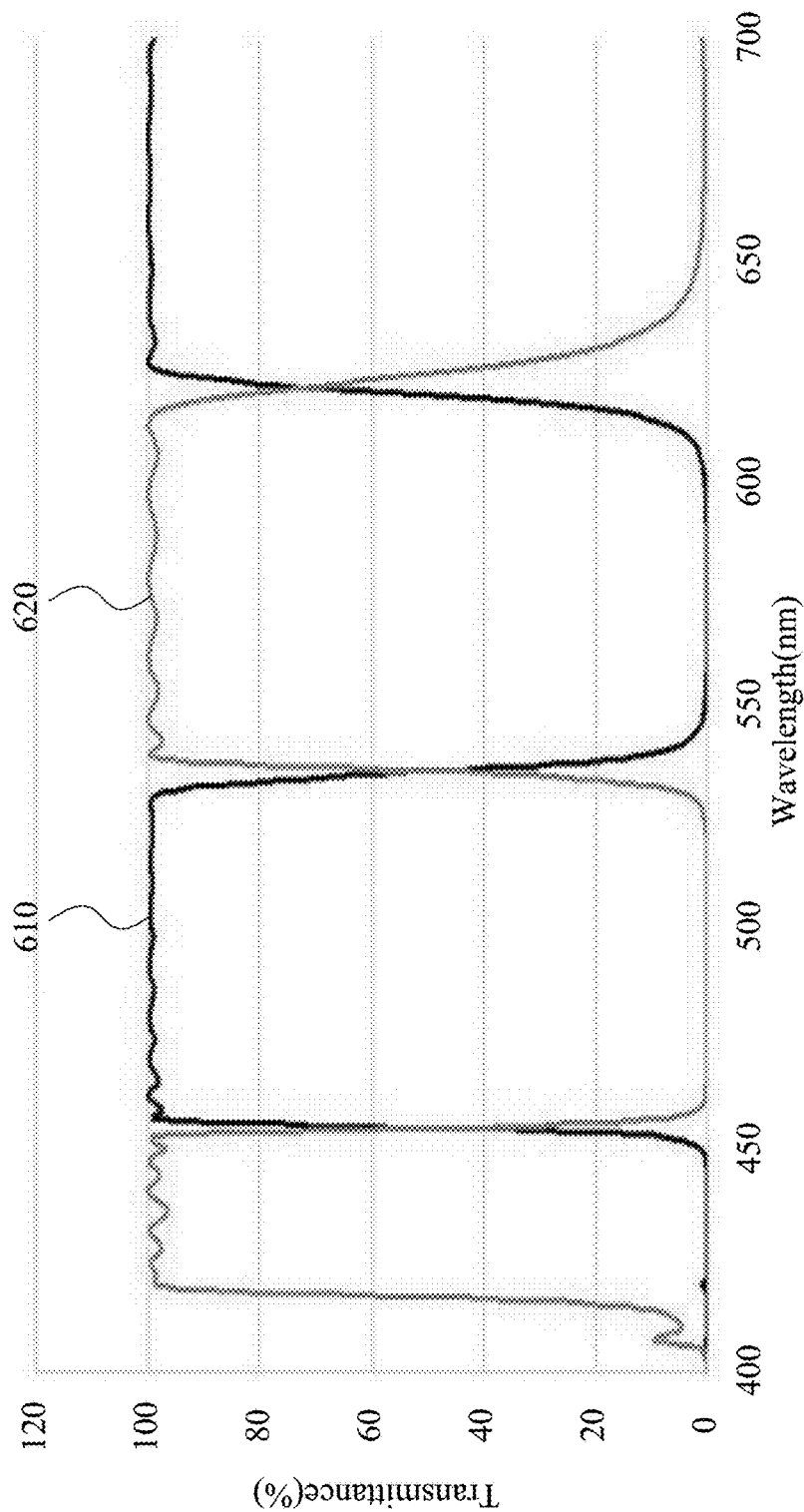
FIG. 10 is a transmittance to wavelength figure of a pair of 3D glasses according to one embodiment of this invention.

FIG. 10 is a transmittance to wavelength figure of a pair of 3D glasses according to one embodiment of this invention. As shown in FIG. 10, curve 610 represents transmittances of the left glass of the pair of the 3D glasses for light with different wavelengths, and curve 620 represents transmittances of the right glass of the pair of the 3D glasses for light with different wavelengths. As shown in FIG. 6, FIG. 8, and FIG. 10, the projector laser light source 100 can be combined with the pair of the 3D glasses to generate three-dimensional images. Specifically, after the first primary blue light, the second primary green light, and the first primary red light generated by the projector laser light source 100 in the first timing, which correspond to spectrum 410, 420, and 430 of FIG. 6, and the second primary blue light, the first primary green light, and the second primary red light generated by the projector laser light source 100 in the second timing, which correspond to spectrum 510, 520, and 530 of FIG. 8, respectively pass the left glass and the right glass of the pair of the 3D glasses, only the first primary blue light, the second primary green light, and the first primary red light pass the left glass, and only the second primary blue light, the first primary green light, and the second primary red light pass the right glass. Therefore, two sets of the three primary light sources respectively pass through the left glass and the right glass, so as to generate three-dimensional images.

Figure 11:
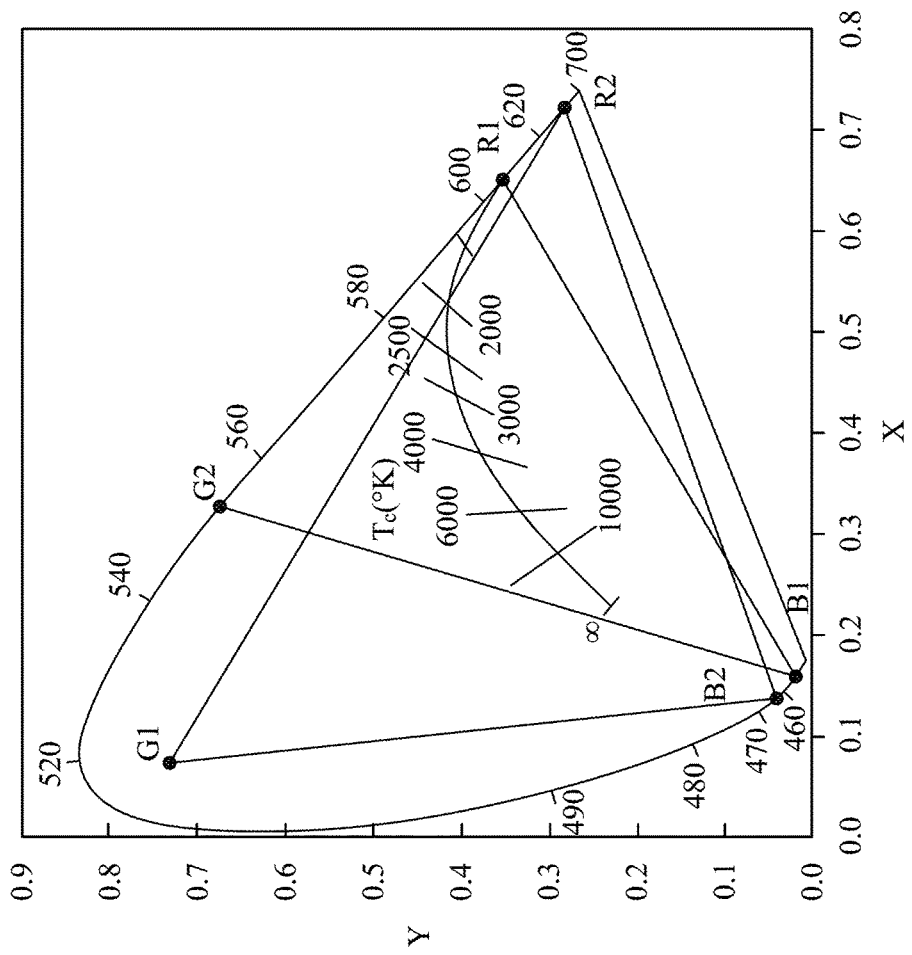
FIG. 11 is a diagram showing positions of a first primary blue light, a second primary green light, a first primary red light, a second primary blue light, a first primary green light, and a second primary red light in the color coordinates according to one embodiment of this invention.

FIG. 11 is a diagram showing positions of the first primary blue light B1, the second primary green light G2, the first primary red light R1, the second primary blue light B2, the first primary green light G1, and the second primary red light R2 in the color coordinates according to one embodiment of this invention. As shown in FIG. 11, the first set of the three primary light formed by the first primary blue light B1, the second primary green light G2, and the first primary red light R1 and the second set of the three primary light formed by the second primary blue light B2, the first primary green light G1, and the second primary red light R2 are respectively located in different positions in the color coordinates. Therefore, the projector laser light source 100 with the two sets of the three primary light sources can indeed provide images with a wider color gamut.

In the optical path, the projector laser light source 100 focuses laser light emitted by the first laser point source 111 and the second laser point source 112 on two points by two optical Fourier transforms performed by the first lens group 120 and the second lens group 130. The aforementioned optical path is also combined with the specially designed optical path of the yellow phosphor layer 141, the reflective layer 142, and the green phosphor layer 143 of the color wheel 140, the reflector 151, the yellow reflector 152, and the green reflector 153, such that the two sets of three primary light is focused on the position of the integration rod 160. Therefore, only a bit of optical components and a simple structure design are needed to generate the two sets of three primary light, such that the volume of the projector laser light source 100 is reduced and the projector laser light source 100 can be accommodated into a conventional video screening device (i.e., a movie projector).

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A projector laser light source, comprising:
   a first laser point source disposed at a first position and configured to emit a first blue light;
   a second laser point source disposed at a second position and configured to emit a second blue light in a first timing and emit a third blue light and a red light in a second timing;
   a first lens group having a front focal plane, wherein the first position and the second position is located on the front focal plane, the first blue light becomes a parallel light directed toward a first direction after the first blue light passes the first lens group, the second blue light, the third blue light, and the red light become parallel light directed toward a second direction after the second blue light, the third blue light, and the red light pass the first lens group;
   a second lens group having a rear focal plane, wherein the second blue light, the third blue light, and the red light passing the first lens group are focused on a third position on the rear focal plane after the second blue light, the third blue light, and the red light pass the second lens group, the first blue light passing the first lens group is focused on a fourth position on the rear focal plane after the first blue light passes the second lens group;
   a color wheel, comprising;
      a yellow phosphor layer, wherein a position of the yellow phosphor layer corresponds to the fourth position in the first timing, the yellow phosphor layer is configured to reflect the incident first blue light and convert the first blue into a yellow light, and the yellow light becomes a parallel light in reverse to the first direction after the yellow light passes the second lens group;
      a reflective layer, wherein a position of the reflective layer corresponds the fourth position in the second timing, the reflective layer is configured to reflect the incident first blue light, and the reflected first blue light become a parallel light in reverse to the first direction after the first blue light passes the second lens group; and
      a green phosphor layer, wherein a position of the green phosphor layer corresponds to a fifth position in the second timing, the green phosphor layer is configured to reflect the incident first blue light and convert the first blue light into a green light, and the green light becomes a parallel light in reverse to a third direction after the green light passes the second lens group;
   a reflector configured to reflect the first blue light in reverse to the first direction, such that the reflected first blue light is toward the third direction and focused on the fifth position on the rear focal plane after the first blue light passes the second lens group;
   a yellow reflector configured to reflect the yellow blue light in reverse to the first direction, such that the reflected yellow light is toward the second direction and focused on the third position on the rear focal plane after the yellow light passes the second lens group;
   a green reflector configured to reflect the green light in reverse to the third direction, such that the reflected green light is toward the second direction and focused on the third position on the rear focal plane after the green light passes the second lens group; and
   an integration rod configured to collect the light focused on the third position.

2. The projector laser light source of claim 1, wherein a ratio of a distance between the first position and the second position and a distance between the third position and the fourth position is the same as a ratio of a focal length of the first lens group and a focal length of the second lens group.

3. The projector laser light source of claim 1, wherein a distance between the third position and the fifth position is the same as a distance between the fourth position and the fifth position.

4. The projector laser light source of claim 1, wherein an optical axis of the first lens group is parallel to an optical axis of the second lens group.

5. The projector laser light source of claim 1, wherein the yellow reflector is perpendicular to an optical axis of the first lens group.

6. The projector laser light source of claim 1, wherein the green reflector is transparent to the first blue light and the yellow light, and the yellow reflector is transparent to the first blue light.

7. The projector laser light source of claim 1, wherein the first lens group comprises two converging lenses, and the second lens group comprises two converging lenses.

8. The projector laser light source of claim 1, wherein the color wheel has an upper part and a lower part, the yellow phosphor layer is disposed on the upper part, the reflective layer and the green phosphor layer are disposed on the lower part, and the reflective layer is closer to a center of the color wheel than the green phosphor is.

9. The projector laser light source of claim 1, wherein a wavelength of the first blue light and the second blue light is the same.

10. The projector laser light source of claim 1, wherein after the integration rod collects the light focused on the third position, the integration rod splits the light to generate a first primary blue light, a second primary green light, and a first primary red light in the first timing and generate a second primary blue light, a first primary green light, and a second primary red light in the second timing.

\* \* \* \* \*